United States Patent [19]

Sakaguchi et al.

[11] Patent Number: 4,860,105
[45] Date of Patent: Aug. 22, 1989

[54] NOISE REDUCING CIRCUIT OF A VIDEO SIGNAL

[75] Inventors: Hironao Sakaguchi, Tokyo; Masaji Yoshida, Yokohama; Yasutoshi Matsuo, Kawasaki, all of Japan

[73] Assignee: Victor Company of Japan, Ltd., Japan

[21] Appl. No.: 195,585

[22] Filed: May 18, 1988

[30] Foreign Application Priority Data

| May 22, 1987 | [JP] | Japan | 62-125245 |
| May 22, 1987 | [JP] | Japan | 62-77177[U] |
| Jun. 22, 1987 | [JP] | Japan | 62-155128 |

[51] Int. Cl.$^4$ ............ H04N 9/64; H04N 5/213; H04N 5/91
[52] U.S. Cl. .................... 358/167; 358/340; 358/36
[58] Field of Search ............... 358/36, 37, 166, 167, 358/340, 327, 293

[56] References Cited

U.S. PATENT DOCUMENTS

| 4,597,021 | 6/1986 | Yamamitsu et al. | 358/340 |
| 4,607,285 | 8/1986 | Hirota et al. | 358/167 |
| 4,652,922 | 3/1987 | Ozaki | 358/167 |
| 4,698,696 | 10/1987 | Matsuo | 358/167 |
| 4,709,269 | 11/1987 | Ozaki | 358/167 |
| 4,750,037 | 6/1988 | Kido et al. | 358/167 |
| 4,768,094 | 8/1988 | Uchinoi | 358/167 |
| 4,779,133 | 10/1988 | Sugimori et al. | 358/167 |

FOREIGN PATENT DOCUMENTS

| 123511 | 8/1982 | Japan . |
| 154986 | 9/1982 | Japan . |
| 97114 | 6/1983 | Japan . |
| 13481 | 1/1988 | Japan . |
| 27178 | 2/1988 | Japan . |

Primary Examiner—James J. Groody
Assistant Examiner—John K. Peng
Attorney, Agent, or Firm—Andrus, Sceales, Starke & Sawall

[57] ABSTRACT

A noise reduction circuit for a video signal recording and/or reproducing apparatus comprises a high pass filter for extracting high frequency signal component form the input luminance signal, a limiter circuit for limiting the high frequency signal component, a multiplier for determining the degree of preemphasis and/or deemphasis by multiplying the limited signal, and summing and subtracting circuits respectively for adding and subtracting the high frequency signal component processed by the limiter circuit and the multiplier to and from the original luminance signal. The limiter circuit has an amplitude characteristic which changes a gradient so as to have a characteristic curve of at least three different gradient slopes interconnected in succession with an increase in amplitude of the signal supplied thereto.

15 Claims, 7 Drawing Sheets

NOISE REDUCING CIRCUIT OF A VIDEO SIGNAL

BACKGROUND OF THE INVENTION

The present invention generally relates to noise reduction circuits, and more particularly to a noise reduction circuit for use in a video signal recording and/or reproducing apparatus such as a video tape recorder in order to eliminate noise components.

Video tape recorders using a so called color-under recording system are widely used. In such a video tape recorder, a luminance signal is frequency modulated and recorded on a magnetic tape together with a frequency converted carrier chrominance signal having a frequency range lower than that of the luminance signal in accordance with the frequency division multiplexing technique. Such a video tape recorder has a tendency that the signal-to-noise ratio (S/N ratio) deteriorates with increasing frequency due to the increase of noise components having a so called triangular spectrum. In order to avoid this problem, the video tape recorder uses a noise reduction circuit which employs a preemphasis to the luminance signal to be recorded prior to the frequency modulation. In other words, a high frequency component of the luminance signal is extracted and added to the original luminance signal after suitable processing. As a result of the preemphasis, the high frequency component of the luminance signal is enhanced. At the time of reproduction, the same noise reduction circuit is used to perform a deemphasis, which is complementary to the preemphasis, to the demodulated luminance signal to complement the preemphasis. In the description hereinafter, the term emphasis will be used to include both preemphasis at the time of recording and deemphasis at the time of reproduction.

In recent years, there is a need to increase the degree of emphasis mainly as a result of the broadened frequency range of the video tape recorder, for example, from the conventional 3 MHz range to 5 MHz range. Generally, the increase in the degree of emphasis certainly increases the effect of noise reduction. However, if the degree of emphasis applied was excessive, the carrier frequency of the frequency modulated luminance signal would deviate too much. This would result in the reproduced picture so called inverted white peak. In other words, when the degree of preemphasis of the high frequency component of the luminance signal becomes excessive as a result of the preemphasis, the side band components of the frequency modulated luminance signal interferes with the frequency converted carrier chrominance signal to such an extent that the reproduced color signal is deteriorated. In order to prevent the excessive frequency modulation of the luminance signal, a white clip circuit is usually used to eliminate from the frequency modulated luminance signal the frequency component deviating to such an extent that it interferes with the frequency converted carrier chrominance signal. However, the use of such a white clip circuit is associated with a possibility of causing a poor picture quality due to the fact that the circuit may cut too much of deviated frequency components.

In order to avoid this problem, the conventional noise reduction circuit uses a limiter circuit which limits the amplitude of the high frequency component of the luminance signal at a predetermined level. Such a limiter circuit generally has an input versus output amplitude characteristic which changes the slope of the characteristic curve stepwise in two stages as the amplitude of the input signal increases.

In the noise reduction circuit using the limiter circuit having such an amplitue characteristic which changes stepwise in only two stages, the slope of the characteristic curve changes sharply when the gain for the input signal having small amplitude is set to a relatively large value. Such a sharp change in the slope of the characteristic curve leads to a difficulty in recovering the original signal at the time of deemphasis. Because of this, the reproduced picture is deteriorated.

Further, such conventional noise reduction circuit has a problem that the emphasis applied to the input luminance signal is virtually the same for a case in which the level of the high frequency components contained in the input luminance signal is small and for a case in which the level of the high frequency components contained in the input luminance signal is intermediate. For example, the effect of preemphasis for the input signal having a level of −20 dB referred to the reference level of 0.4 Vp-p is virtually the same as the effect of preemphasis for the input signal having a level of −30 dB.

Furthermore, the conventional noise reduction circuit uses a feedback loop for appropriately shaping the waveform of the output signal. However, the use of such feedback loop tends to cause oscillation when the setting of the amount of feedback is not appropriate.

Furthermore, the conventional noise reduction circuit has a problem in that a horizontally streaking noise appears on the screen in the reproduced picture responsive to incoming of a noise impulse. In order to avoid this horizontally streaking laterally spread noise associated with the noise impulse, one has to admit, as a trade-off, a residual random noise visible for relatively long periods, which is of course a disadvantage.

SUMMARY OF THE INVENTION

Accordingly, it is a general object of the present invention to provide a novel and useful noise reduction circuit for a video signal recording and/or reproducing apparatus in which the aforementioned problems are eliminated.

Another and more specific object of the present invention is to provide a noise reduction circuit for a video signal recording and/or reproducing apparatus which effectively suppresses the power of signal components in the lower sideband of a frequency modulated luminance signal which interferes with the frequency converted carrier chrominance signal, even in such a case that the degree of preemphasis and/or deemphasis is higher than conventional one.

Another object of the present invention is to provide a noise reduction circuit for a video signal recording and/or reproducing apparatus in which the degree of preemphasis and/or deemphasis is higher than conventional one for a signal having a small amplitude as compared with the case for a signal having a medium amplitude.

Another object of the present invention is to provide a noise reduction circuit for a video signal recording and/or reproducing apparatus comprising a preemphasis and/or deemphasis circuit and a limiter having a non-linear amplitude characteristic in which the slope of the characteristic curve of the limiter decreases stepwise in three stages with increasing amplitude of an input signal. According to the present invention, the use of limiter having such an amplitude characteristic enables the setting of the gain of the noise reduction circuit to a large value for an input signal having a small signal level while maintaining a conventional limiting characteristic for signals having intermediate and large levels. As a result, the degree of emphasis can be higher for small signals without increasing the amount of signals eliminated by the white clip circuit, and the noise is reduced effectively.

Another object of the present invention is to provide a noise reduction circuit having a low pass filter cooperating with a multiplier circuit which determines the degree of emphasis. According to the present invention, the excessive emphasis of the luminance signal in the high frequency range which interferes with the frequency converted carrier chrominance signal is avoided. Further, as a result of the provision of the low pass filter, the undesirable oscillation of the noise reduction circuit is avoided.

Another object of the present invention is to provide a noise reduction circuit having a preemphasis and/or deemphasis circuit in which the time constant of the preemphasis and/or deemphasis circuit is set to a predetermined range. According to the present invention, the noise reduction circuit effectively suppresses the random noise as well as the impulse noise.

Still other objects and further features of the present invention will become apparent from the following detailed description of preferred embodiments when read in conjunction with attached drawings.

DETAILED DESCRIPTION

Figure 1:
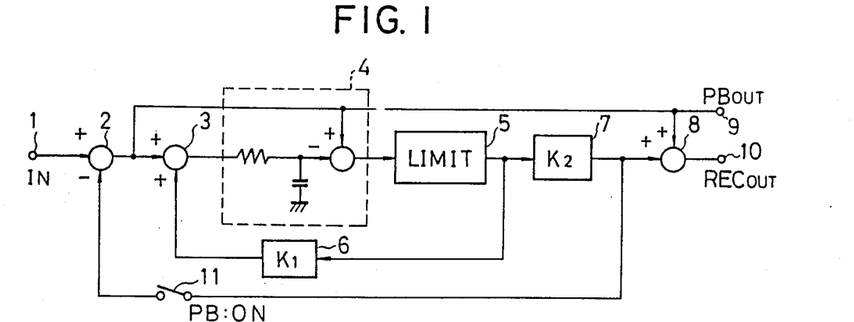
FIG. 1 is a systematic block diagram showing a first embodiment of noise reduction circuit according to the present invention.

FIG.1 shows a circuit diagram of a first embodiment of the noise reduction circuit of the present invention. This noise reduction circuit operates as a preemphasis circuit when a switch 11 is opened. In this mode of operation, an input luminance signal applied to an input terminal 1 for recording is passed through a high pass filter circuit 4 where the low frequency component of the video signal is filtered out from the original luminance signal. Thus, a high frequency component of the luminance signal is extracted from the luminance signal. The high frequency component of the luminance signal thus obtained is then subjected to amplitude limitation in a non-linear limiter circuit 5 and looped back to an input port of the high pass filter circuit 4 through a multiplier 6 and a summing circuit 3. The multiplier 6 sets the time constant of the preemphasis operation by adjusting the amount of feedback signal passing therethrough. The signal looped back to the summing circuit 3 is added with the input luminance signal, and after passing through the high pass filter circuit 4 and non-linear limiter circuit 5, the signals is passed through a second multiplier 7 for setting the degree of emphasis. The output signal from the multiplier 7 is then supplied to a second summing circuit 8 where it is added to the input luminance signal and the resultant output signal is supplied to an output terminal 10. Thus, an output signal applied with preemphasis is obtained at the output terminal 10. The multipliers 6 and 7 are circuits which modify the amplitude of the input signal supplied thereto by respective coefficients K1 and K2. The suitable coefficient K1 of the multiplier 6 is chosen for example to be 0.83, and the suitable coefficient K2 of the multiplier 7 is chosen for example to be 2.3.

When the switch 11 is closed, the circuit operates as a deemphasis circuit. In this mode of operation, a reproduced luminance signal already applied with preemphasis at the time of recording is applied to the input terminal 1 and then supplied to the summing circuit 3 through a subtracting circuit 2. The circuit processes the output signal of the subtracting circuit 2 exactly in a same manner with the case of preemphasis up to a point where the processed signal reaches the multiplier 7. There, the output signal of the multiplier 7 is looped back to the subtracting circuit 2 through the switch 11 now closed where it is subtracted from the input luminance signal. Thus, the deemphasis is performed on the input luminance signal and the output luminance signal thus obtained is branched at an output port of the subtracting circuit 2 to an output terminal 9.

The high pass filter circuit 4 of the noise reduction circuit of FIG.1 is designed to have a time constant Ts which falls in a range defined by the degree of emphasis X and a lower frequency limit at which the preemphasis and/or deemphasis becomes effective such that $T>Ts>T/(X+1)$. The time constant Ts of the high pass filter circuit 4 is set as such in order to suppress the horizontally streaking noise associated with the noise impulse by shaping the trailing edge of an output impulse produced at the non-linear limiter circuit 5 responsive to the input of a noise impulse so that it has a steep gradient. In other words, the output impulse of the high pass filter circuit 4 thus shaped does not have a gradually decreasing slope at the trailing edge and therefore the horizontally streaking noise associated with the noise impulse is rapidly suppressed.

Further, the noise reduction circuit of the present invention reduces the time period during which the residual random noise appears on the screen as a result of the use of the known feedback construction. Thus, the noise reduction circuit of FIG.1 not only suppresses the impulse noise effectively but also suppresses the residual random noise effectively.

Figure 2A:
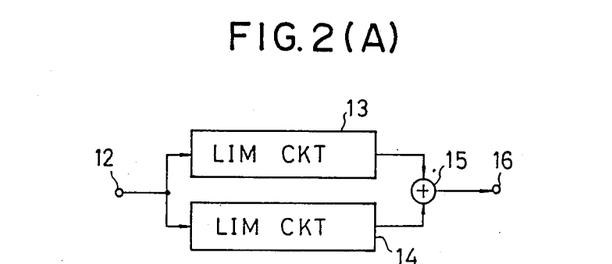
FIG. 2(A) is a systematic block diagram showing the construction of a limiter circuit shown in FIG. 1.

FIG.2(A) shows an example of the non-linear limiter circuit 5 of the noise reduction circuit of FIG.1. This circuit comprises two limiter circuits 13 and 14 having respective limiting levels and a summing circuit 15 for summing the output signals from the both limiter circuits. Referring to FIG.2(A), the output signal from the high pass filter circuit 4 is supplied to an input terminal 12. The signal is subjected to amplitude limitation in the circuits 13 and 14 and the resultant signals are added in the summing circuit 15. The output signal of the summing circuit 15 is supplied to an output terminal 16.

Figure 3:
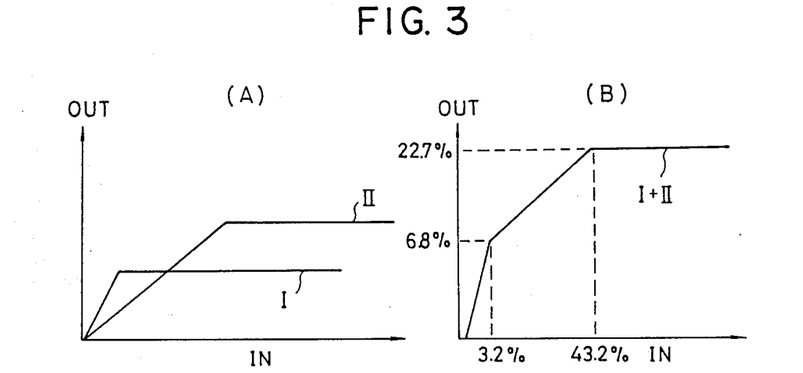
FIG. 3(A) is a graph showing an example of amplitude characteristic of the limiter shown in FIG. 2(A)
FIG. 3(B) is a graph showing an overall amplitude characteristic of the limiter shown in FIG. 1.

FIG.3(A) shows the input versus output amplitude characteristics of the limiter circuit 13 and the limiter circuit 14 respectively by a curve I and a curve II. FIG.3(B) shows an overall input versus output amplitude characteristic of the non-linear limiter circuit 5. As can be seen in the drawing, the gradient of the overall characteristic curve changes to form three slopes of different gradients with the increase in amplitude of the input signal. This characteristic is produced by adding the characteristic curve I and characteristic curve II for the two limiter circuits 13 and 14 shown in FIG.2(A).

In the preferred embodiment, the overall characteristic curve of the non-linear limiter circuit 5 changes from a steep slope then to a less steep slope at a first bend portion located at a position corresponding to where the normalized amplitude of the input signal referred to the maximum amplitude of the input signal is 3.2% and the normalized amplitude of the output signal referred to the maximum amplitude of the input signal is 6.8%. The characteristic curve further changes to a substantially flat slope at a second bend portion located at a position corresponding to where the normalized amplitude of the input signal referred to the maximum amplitude of the input signal is 43.2% and the normalized amplitude of the output signal referred to the maximum amplitude of the input signal is 22.7%.

Figure 2B:
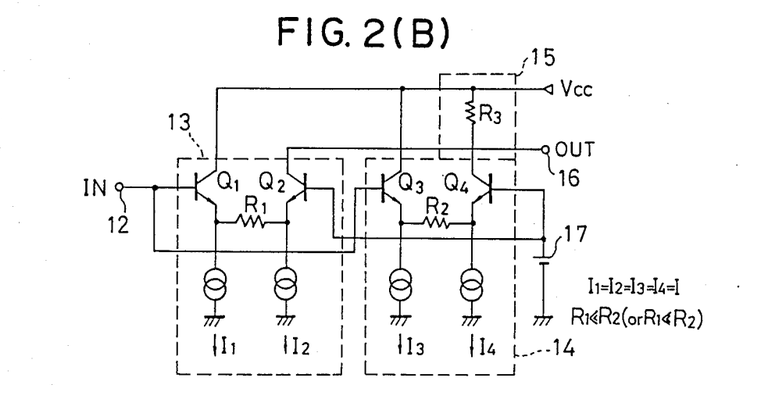
FIG. 2(B) is a circuit diagram showing an example of actual construction of the limiter circuit of FIG. 2(A)

FIG.2(B) shows an example of the actual circuit of the non-linear limiter circuit 5. In the drawing, transistors Q1 and Q3 have a base connected to the input terminal 12 and the transistors Q2 and Q4 gave a base connected to a positive side of a constant voltage source 17. Further, the transistors Q1-Q4 have emitters connected to the ground through respective constant current sources. Each of the current sources produce a current flow having a value I. The emitters of the transistors Q1 and Q2 are connected to each other through a resistor R1 and the emitters of the transistors Q3 and Q4 are connected to each other through a resistor R2. Furthermore, collectors of the transistors Q1 and Q3 are connected directly to the voltage supply and the collectors of the transistors Q2 and Q4 are connected on the one hand to the voltage supply via a resistor R3 and on the other hand to the output terminal 16.

Next, the operation of the non-linear limiting circuit 5 shown in FIG.2(B) will be described. In such a case that the input signal level at the input terminal 12 is equal to the voltage produced by the constant voltage source 17, the currents flowing through the transistors Q1 and Q2 which form a differential amplifier are equal to each other. Similarly, the currents flowing through the transistors Q3 and Q4 are equal. On the contrary, in such a case that the level of the input signal increases relative to the voltage of the constant voltage source 17 and exceeds a level R1, the transistor Q2 is cut off and the transistor Q1 saturates at a current level of 2I. Similarly, in such a case that the level of the input signal decreases relative to the voltage of the constant voltage source 17 to become smaller than the current level $-I.Rl$, the transistor Q1 is cut off and the transistor Q2 saturates at a current level of 2I. The transistors Q3 and Q4 are similarly cut off when the input signal level increases or decreases relative to the level I.R2.

Thus, if the emitter resistance of the transistors Q1–Q4 is neglected, the limiter circuit 13 formed by the transistors Q1 and Q2 limits the amplitude of the input signal within a level of $\pm I.R1$. Similarly, the limiter circuit 14 formed by the transistors Q3 and Q4 limits the amplitude of the input signal within a level of $\pm I.R2$. When the values of the resistors R1 and R2 are selected so that $R1<<R2$, the non-linear limiter circuit 5 operates with two different limiting levels. The output signals from the limiter circuits 13 and 14 are added by connecting the collectors of the transistors Q2 and Q4 at one end of the resistor R3 to form the output signal to be supplied to the output terminal 16. It would be obvious that one can construct the circuit to provide an amplitude characteristic which changes the slope stepwise in more than three stages by connecting more than two similar limiter circuits in parallel.

In such a non-linear limiter circuit, one can choose the position of the characteristic curve at which the slope of the characteristic curve changes as desired by adjusting the limiting level of the limiter circuits. Further, since the overall characteristic curve is produced by the summation of two or more characteristic curves, one can realize a characteristic curve portion having a steep gradient by using limiter circuits each of which produces a less steep characteristic curve portion.

Figure 4:
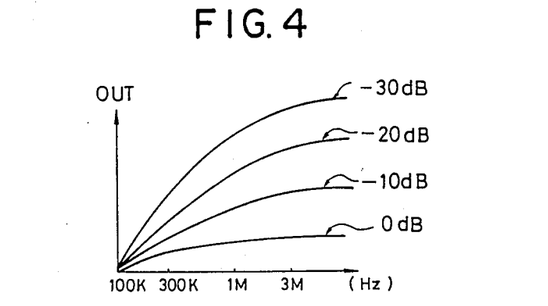
FIG. 4 is a graph showing a preemphasis characteristic of a noise reduction circuit of FIG.1.

FIG.4 shows the preemphasis characteristic of the noise reduction circuit using the non-linear limiter circuit 5 as shown in FIG.1. It should be noted that the response of the noise reduction circuit for an input luminance signal having a level of $-30$ dB is clearly distinguished from that of the input luminance signal having a level of $-20$ dB. In other words, the luminance signal having a small input level such as $-30$ dB is applied with a large amount of preemphasis while the luminance signal having intermediate levels such as $-10$ or $-20$ dB is applied with an intermediate degree of preemphasis. It is needless to say that the input luminance signal having a large signal level is applied with very limited degree of preemphasis.

Figure 5:
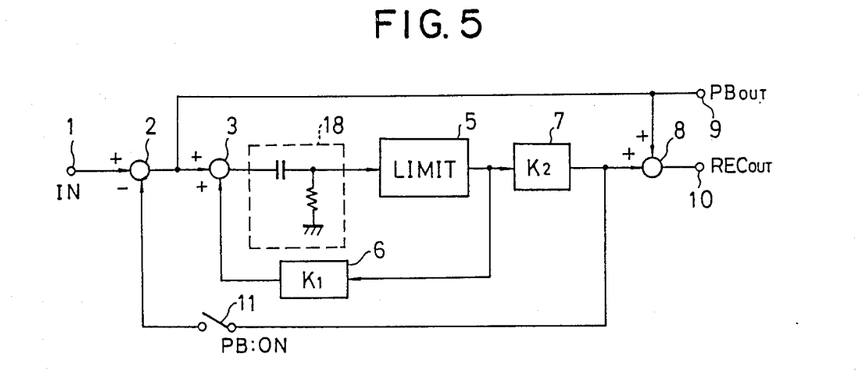
FIG.5 is a system block diagram showing a modification of the noise reduction circuit of FIG.1.

FIG. 5 is a systematic block diagram showing a modification of the first embodiment. In the drawing, those parts constructed identically to those corresponding parts of FIG. 1 are given identical reference numerals and the description thereof will be omitted.

In this modification, the high pass filter circuit 18 is constructed by a high pass filter formed by a resister and a capacitor alone. Thus, one can eliminate the subtracting circuit for subtracting the filtered signal from the input luminance signal to extract the high frequency component as in the case in FIG. 1 from the construction of the high pass filter circuit to simplify the circuit construction of the noise reduction circuit.

Figure 6:
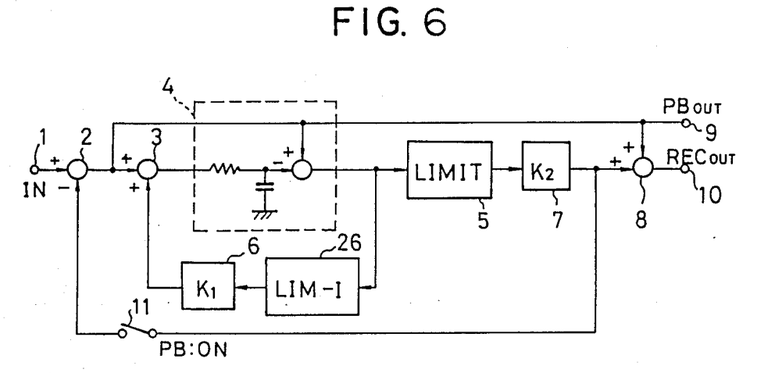
FIG.6 is a system block diagram showing another modification of the noise reduction circuit of FIG.1.

FIG. 6 shows another modification of the noise reduction circuit shown in FIG. 1. In the drawing, those portions constructed identically to those corresponding portions of FIG. 1 are given identical reference numerals and the description thereof will be omitted.

In this noise reduction circuit, another limiter circuit 26 is interposed in series with the multiplier 6 in the feedback loop feeding back the output signal of the high pass filter circuit 4 to its input port. This limiter circuit 26 may be a usual limiter circuit limiting the amplitude of the input signal at a predetermined level or may be the non-linear limiter circuit described with reference to FIGS. 2(A) and 2(B). Use of such second limiter circuit provides degree of freedom in adjusting the preemphasis and/or deemphasis characteristic of the noise reduction circuit.

Figure 7:
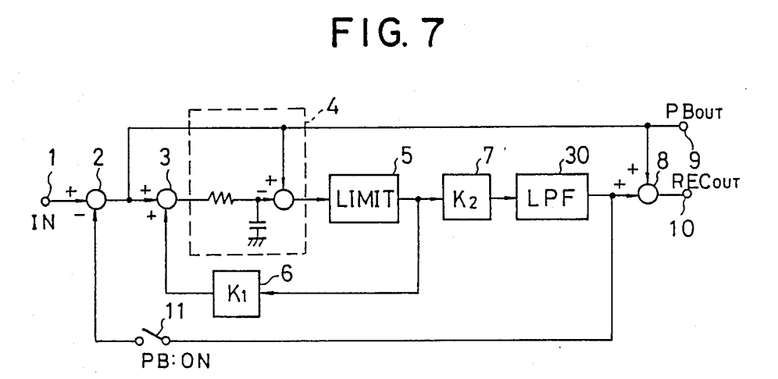
FIG.7 is a system block diagram showing still other modification of the noise reduction circuit of FIG.1.

FIG. 7 shows a further modification of the noise reduction circuit shown in FIG. 1. In this noise reduction circuit, a low pass filter 30 is connected at an output port of the multiplier 7. Thus, the output signal of the multiplier 7 is supplied to the summing circuit 8 or the subtracting circuit 2 after passing through the low pass filter 30.

Figure 8:
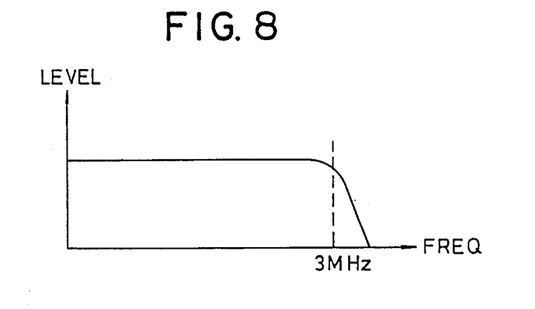
FIG.8 is a graph showing a frequency characteristic of a low pass filter used in the noise reduction circuit in FIG.7.

FIG. 8 shows the frequency characteristic of the low pass filter 30. As can be seen in the drawing, the low pass filter 30 is a filter having a cutoff frequency at around 3 MHz. Use of such a low pass filter connected to the output port of the multiplier circuit 7 leads to an overall preemphasis characteristic of the noise reduction circuit as shown by continuous lines in FIG. 9.

Figure 9:
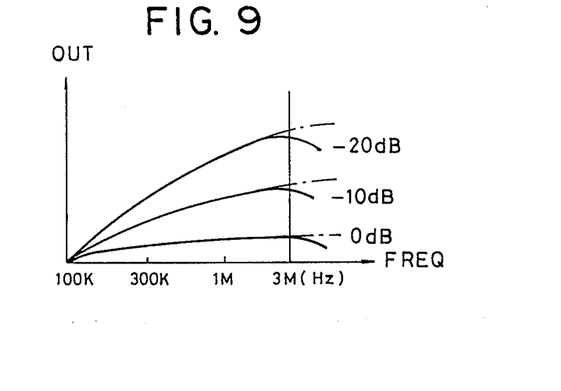
FIG.9 is a graph showing a preemphasis characteristic of the noise reduction circuit of FIG.7.

Referring to FIG. 9, it can be seen that the input luminance signal is increasingly emphasized with frequency until a peak at around 3 MHz is reached. After passing the peak, the degree of emphasis starts decreasing with frequency. For the purpose of comparison, the characteristic curve of preemphasis without using the low pass filter 30 is shown in the drawing by a one dotted line. This characteristic curve corresponds to the characteristic curve shown in FIG. 4.

As can be seen in FIG. 9, the low pass filter 30 suppresses the preemphasis in the high frequency range. Thus, the signal power of the lower sideband components of the frequency modulated luminance signal which interferes the frequency converted carrier chrominance signal is suppressed during the preemphasis.

Figure 10:
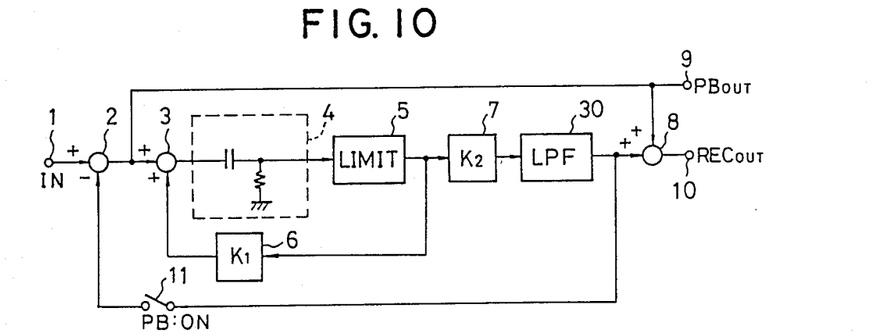
FIG.10 is a system block diagram showing a further modification of the noise reduction circuit of FIG.5.
Figure 11:
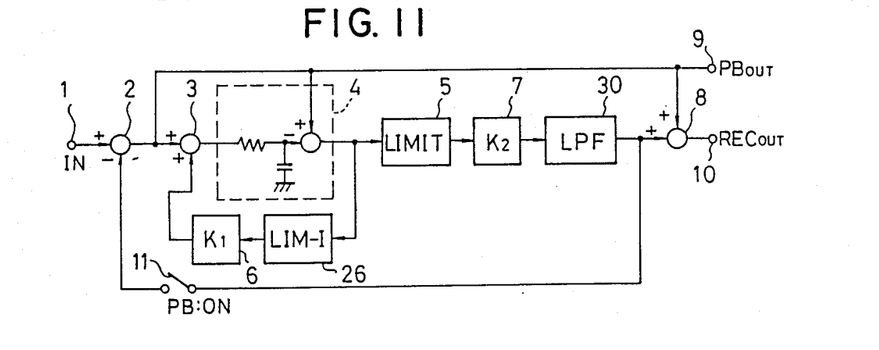
FIG.11 is a system block diagram showing still other modification of the noise reduction circuit of FIG.6.

FIGS. 10 and 11 show modifications of the noise reduction circuits of FIGS. 5 and 6 in which the low pass filter 30 is connected to the multiplier circuit 7. As the operations of the circuits are substantially and respectively the same as that of the circuits of FIGS. 5 and 6 except for the effect of the low pass filter 30 already described, the description thereof will be omitted.

Figure 12:
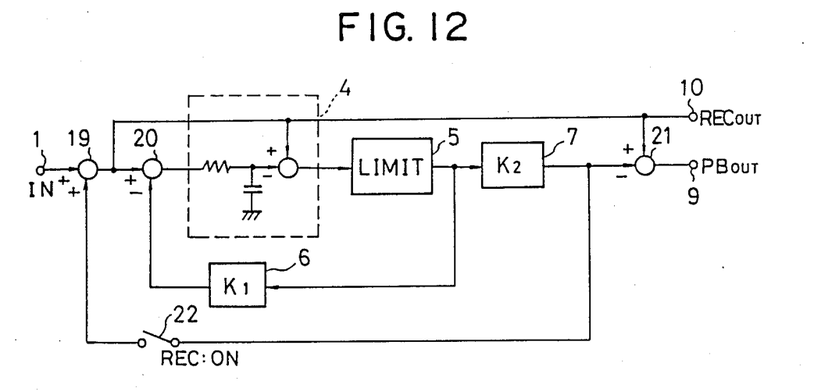
FIG.12 is a system block diagram showing a second embodiment of the noise reduction circuit of the present invention.

FIG. 12 shows a second embodiment of the noise reduction circuit of the present invention. In the drawing, those portions constructed identically to those corresponding portions of FIG. 1 are given identical reference numerals and the description thereof will be omitted.

In this embodiment, the switch 11 is replaced by a switch 22 and the circuit operates as a deemphasis circuit when the switch 22 is opened. The circuit operates as a preemphasis circuit when the switch 22 is closed. The subtracting circuit 2 is replaced by a summing circuit 19 and the summing circuit 8 is replaced by a subtracting circuit 21. When the switch 22 is opened, the output signal of the multiplier 7 is supplied to the subtracting circuit 21 where the output signal is subtracted from the input luminance signal and the deemphasis is performed on the input luminance signal. The luminance signal thus applied with deemphasis is then supplied to the output port 9 as the deemphasis signal.

When the switch 22 is closed, the output signal of the multiplier 7 is looped back to the summing circuit 19 through the switch 22 where it is added with the input luminance signal and an output signal applied with preemphasis is obtained. This output signal is branched at an output port of the summing circuit 19 and supplied to the output terminal 10 as the preemphasis signal.

Again, the time constant Ts of the high pass filter circuit is chosen to be in a predetermined range such that $T > Ts > T/(X+1)$. The reason for setting the time constant Ts as such is already described.

Figure 13:
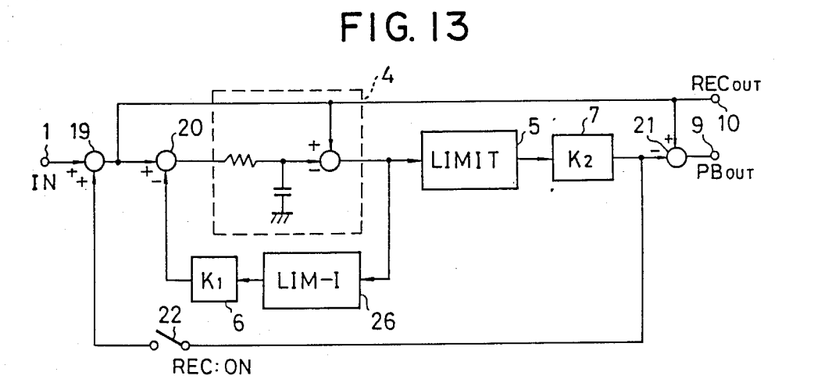
FIG.13 is a system block diagram showing a modification of the noise reduction circuit of FIG.12.

FIG. 13 is a modification of the noise reduction circuit of FIG. 12. In this modification, the limiter circuit 26 described with reference to FIG. 6 is provided in the feed back loop feeding back the output signal of the high pass filter circuit 4 to its input port. The remaining construction and the feature of the present modification is identical to the circuit of FIG. 6 and the description thereof will be omitted.

Figure 14:
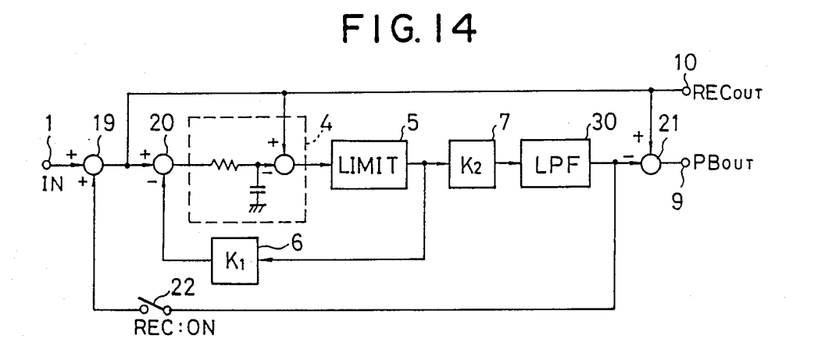
FIG.14 is a system block diagram showing another modification of the noise reduction circuit of FIG.12.

FIG. 14 is another modification of the noise reduction circuit of FIG. 12. This circuit is identical to the circuit of FIG. 12 except for the use of the low pass filter 30 connected in series to the output port of the multiplier circuit 7. Thus, the output signal from the multiplier 7 is supplied to the subtracting circuit 21 and to the summing circuit 19 after passing through the low pass filter 30. The function and the characteristic of the low pass filter 30 is already described with reference to FIGS. 8 and 9. Thus, as a result of the use of the low pass filter 30, the characteristic of preemphasis of the noise reduction circuit of FIG. 14 takes a form as shown by continuous lines in FIG. 9.

Figure 15:
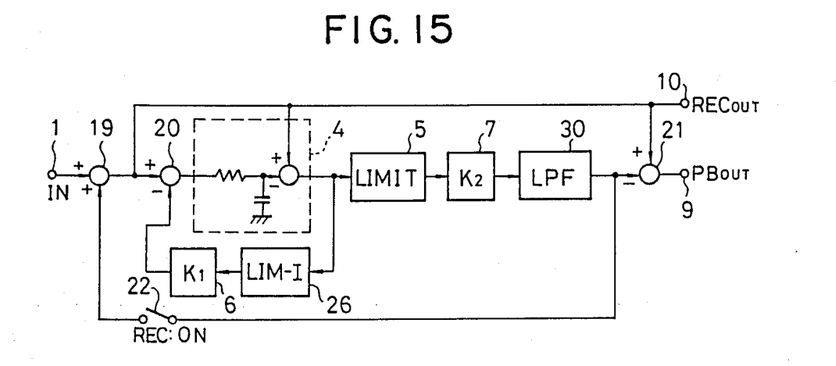
FIG.15 is a system block diagram showing still other modification of the noise reduction circuit of FIG.13.

FIG. 15 is another modification of the noise reduction circuit of FIG. 13. In this modification, the low pass filter 30 is connected to the output port of the multiplier 7. The remaining construction and operation of the circuit is identical with those of the noise reduction circuit of FIG. 13.

Figure 16:
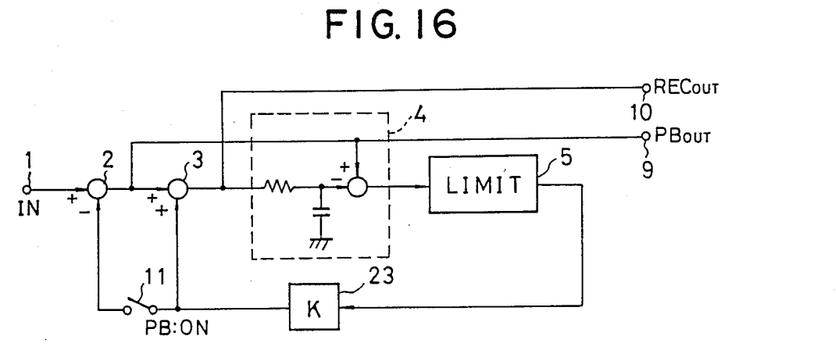
FIG.16 is a system block diagram showing a third embodiment of the noise reduction circuit of the present invention.

FIG. 16 shows a third embodiment of the noise reduction circuit of the present invention. In the drawing, those portions constructed identically to those corresponding portions of preceding drawings are given identical reference numerals and the description thereof will be omitted.

In this circuit, the subtracting circuit 2 and the summing circuit 3 are connected in series and the input luminance signal applied to the input terminal 1 is supplied to the high pass filter circuit 4 after passing through the subtracting circuit 2 and the summing circuit 3 respectively.

The circuit of this example operates as a preemphasis circuit when the switch 11 is opened and operates as a deemphasis circuit when the switch 11 is closed. When the switch 11 is opened, the input luminance signal applied to the input terminal 1 is passed through the high pass filter circuit 4 in which the low frequency component is filtered out from the input luminance signal and the high frequency component of the luminance signal is produced. The high frequency component thus obtained is then passed through the non-linear limiter circuit 5 described previously. The output signal oi the non-linear limiter circuit 5 is then passed through a multiplier 23 which modifies the amplitude of the input signal supplied thereto by a factor K. After passing through the multiplier 23, the high frequency component& of the input luminance signal reaches the summing circuit 3. In the summing circuit 3, the high frequency component of the luminance signal is added to the luminance signal to form an output signal applied with preemphasis. This output signal is then branched to the output terminal 10.

When the switch 11 is closed, the output signal from the multiplier 23 is supplied to a subtractor 2 where it is subtracted from the incoming luminance signal. Thus, the deemphasis is performed on the luminance signal and the output luminance signal applied with the deemphasis is branched at the output port of the subtracting circuit 2 and fed to the output terminal 9. Thus, both the preemphasis signal and the deemphasis signal are formed after looping back the output signal of the non-linear limiter circuit 5 to the summing circuit 3 and the subtractor circuit 2 which are both located at the input side of the high pass filter circuit 4.

Again, the time constant Ts of the high pass filter circuit 4 is set to fall in a range $T > Ts > T/(X+1)$.

Figure 17:
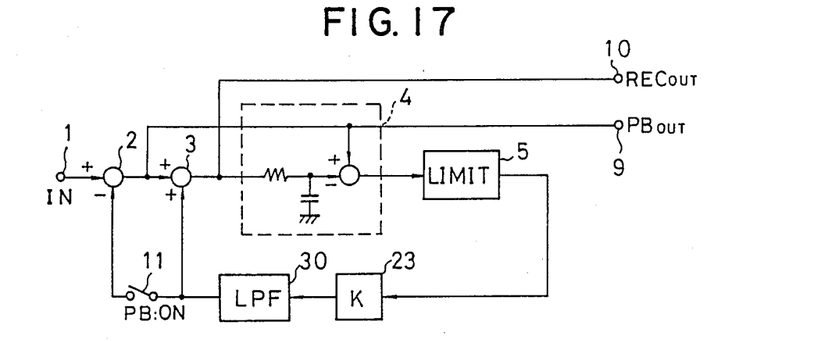
FIG.17 is a system block diagram showing another modification of the noise reduction circuit of FIG.16.

FIG. 17 shows a modification of te noise reduction circuit of FIG. 16 in which the law pass filter 30 is provided in the feed back loop feeding back the output signal of the non-linear limiter circuit 5 to the subtracting circuit 2 and to the summing circuit 3. Thus, the high frequency component of the luminance signal outputted from the high pass filter 4 is subjected to the low pass filter 30 before being added to or subtracted from the input luminance signal. As a result, the preemphasis characteristic as illustrated in FIG. 9 by the continuous lines is obtained.

Figure 18:
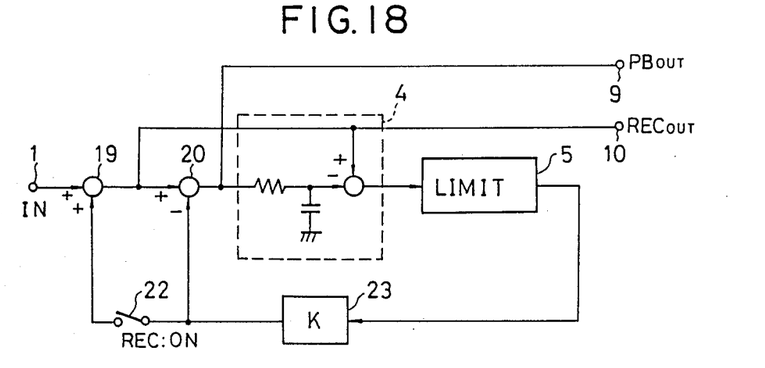
FIG.18 is a system block diagram showing a fourth embodiment of the noise reduction circuit of the present invention.

FIG. 18 shows a fourth embodiment of the noise reduction circuit of the present invention. In the drawing, those portions constructed identically to those corresponding portions in FIG. 16 are given identical reference numerals and the description thereof will be omitted.

Referring to FIG. 18, it is noted that the summing circuit 19 and the subtracting circuit 20 are connected in a reversed order as compared with the case of the circuit of FIG. 17. In other words, the output signal from the summing circuit 19 is supplied to the subtracting circuit 20. Further, the switch 22 which is closed in the recording mode is used in place of the switch 11. Other operations of the circuit are generally identical with that of the circuit in FIG. 7 and the description thereof will be omitted.

Figure 19:
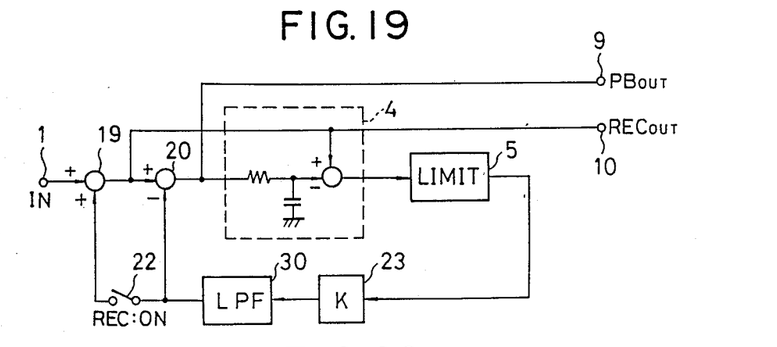
FIG.19 is a system block diagram showing another modification of the noise reduction circuit of FIG.18.

FIG. 19 shows a modification of the noise reduction circuit of FIG. 18. In this modification, the low pass filter 30 is connected in series with the multiplier 23. As a result, the circuit has a preemphasis characteristic as illustrated in FIG. 9 by the continuous lines.

Figure 20:
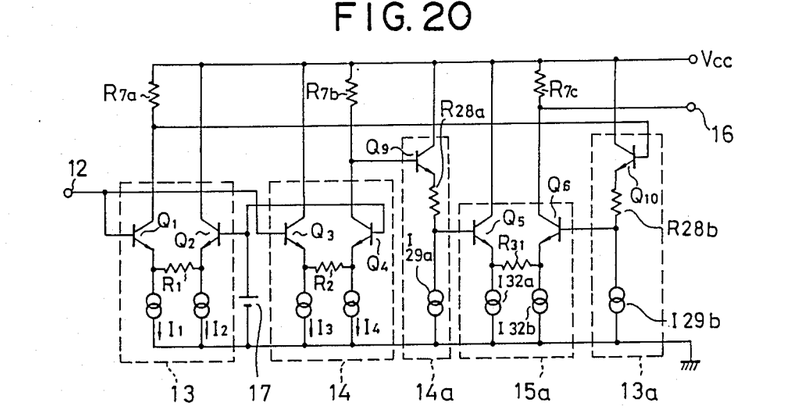
FIG.20 is a circuit diagram showing another construction of the limiter.

FIG. 20 shows another example of the detailed circuit diagram of the non-linear limiter circuit 5. In the drawing, those portions constructed identically with those corresponding portions of FIG. 2(B) are given identical reference numerals and the description thereof will be omitted.

Referring to FIG. 20, the collector of the transistor Q1 is on the one hand connected to the power supply through a resistor R7a and on the other hand to the base of a transistor Q10. The collector of the transistor Q10 is connected to the power supply and the emitter of the transistor Q10 is connected to the ground via a resistor R28b and the constant current source I29b. The collector of the transistor Q4 is on the one hand connected to the power supply via a resistor R7b and on the other hand is connected to the base of the transistor Q9. The collector of the transistor Q9 is connected to the power supply and the emitter of the transistor Q9 is connected to the ground via a resistor R28a and a constant current source I29a. Further, a transistor Q5 is provided between the power source and the ground such that the collector-emitter path of the transistor Q5 and a constant current source I32a connected in series thereto connect the power source and the ground. Similarly, a transistor Q6 is provided between the power source and the ground such that the collector-emitter path of the transistor Q6 and a constant current source I32b connected in series thereto connect the power source and the ground. The base of the transistor Q5 is connected to the emitter of the transistor Q9 via the resistor R28a and the base of the transistor Q6 is connected to the emitter of the transistor Q10 via the resister R28b. Further, the emitters of the transistors Q5 and Q6 are connected to each other via a resistor R31. The output signal of the non-linear limiter circuit thus constructed is obtained from the output terminal 16 connected to the collector of the transistor Q6.

In such a non-linear limiter circuit, the transistor Q9, resistor R28a and the constant current source I29a form a buffer circuit 14a cooperating with the limiter circuit 14 while the transistor Q10, resistor R28b and the constant current source 29b form another buffer circuit 13a cooperating with the limiter circuit 13. Further, the transistors Q5, Q6, resistor I31 and the constant current sources 32a and 32b form a differential amplifier 15a. The output signals from the respective limiter circuits are supplied to the differential amplifier 15a circuits 13a and 14a. Thus, the sum of these output signals is obtained at the output terminal 16.

It should be noted that the non-linear limiter circuit can be constructed by any number of limiter circuits each having a different input versus output amplitude characteristic.

Further, the present invention is not limited to these embodiments, but various variations and modifications may be made without departing from the scope of the present invention.

What is claimed is:

1. A noise reduction circuit for use in a video signal recording and/or reproducing apparatus comprising:
   an input terminal to which an input video signal is applied;
   high pass filter means for extracting a high frequency signal component according to a predetermined frequency characteristic from the input video signal applied to the input terminal;
   first amplitude modifying means supplied with the high frequency signal component from the high pass filter means as an input signal for producing a first processed signal having a modified amplitude in accordance with a predetermined amplitude characteristic curve which changes a gradient thereof forming at least three slopes of different gradient with an increase in amplitude of the input signal supplied thereto, said amplitude characteristic curve having a first predetermined slope of said three slopes for an input signal supplied thereto having a small amplitude which is smaller than a first predetermined level, said amplitude characteristic curve having a second predetermined slope of said three slopes being less steep as compared with the first predetermined slope for an input signal supplied thereto having an intermediate level which is larger than the first predetermined level but smaller than a second predetermined level, said amplitude characteristic curve having a third predetermined slope of said three slopes which is substantially flat for an input signal supplied thereto having a large level which is larger than the second level;

amplifying means supplied with the first processed signal from the first amplitude modifying means for modifying the amplitude of the processed signal supplied thereto by a predetermined coefficient to produce a second processed signal;

first summing means supplied with the second processed signal from the amplifying means and the input video signal for adding the second processed signal to the input video signal to produce a preemphasis signal; and first subtracting means supplied with the second processed signal from the amplifying means and the input video signal for subtracting the second processed signal from the input video signal to produce a deemphasis signal.

2. A noise reduction circuit as claimed in claim 1 in which said first amplitude modifying means comprises at least a pair of limiter circuits having respective limiting levels for producing output signals having amplitudes limited at the respective limiting levels and a summing circuit summing the output signals from the respective limiter circuits.

3. A noise reduction circuit as claimed in claim 1 in which said first amplitude modifying means comprises at least a pair of limiters having respective amplitude characteristic curves, and said amplitude characteristic curve of the first amplitude modifying means is produced as a sum of respective amplitude characteristic curves of the limiters.

4. A noise reduction circuit as claimed in claim 2 in which said summing circuit is a differential amplifier.

5. A noise reduction circuit as claimed in claim 1 further comprising a low pass filter means having a frequency characteristic which cuts off the frequency component substantially higher than 3 MHz from an input signal applied thereto according to a predetermined characteristic curve connected at an output port of said amplifying means, said second processed signal, being passed through the low pass filter means before it is supplied to the first subtracting means, and said second processed signal being passed through the low pass filter means before it is supplied to the first summing means.

6. A noise reduction circuit as claimed in claim 1 further comprising a feedback loop for feeding back the first processed signal from the first amplitude modifying means to an input port of the high pass filter means, said feedback loop comprising a multiplier for modifying the amplitude of the first processed signal by a predetermined coefficient to produce a feedback signal and a second summing means for adding the feedback signal with the input video signal from the input terminal to produce a second input video signal to be supplied to the high pass filter means.

7. A noise reduction circuit as claimed in claim 6 in which said first subtraction means is provided in a signal path extending from the input terminal to the input port of the high pass filter means at a side closer to the input terminal relative to the second summing means so as to receive the input video signal from the input terminal at an input port of the first subtraction means for a subtraction, the second processed signal is supplied to another input port of the first subtraction means for the subtraction through another feedback loop including a switch which is turned on and turned off respectively during the reproduction mode and the recording mode of the video signal recording and/or reproducing apparatus, and the output deemphasis signal produced by the first subtracting means is supplied to the second summing means and at the same time branched to an output terminal.

8. A noise reduction circuit as claimed in claim 1 further comprising a feedback loop for feeding back the first processed signal from the first amplitude modifying means to an input port of the high pass filter means, said feedback loop comprising a multiplier for modifying the amplitude of the first processed signal by a predetermined coefficient to produce a feedback signal and a second subtracting means for subtracting the feedback signal from the input video signal from the input terminal to produce a second input video signal to be supplied to the high pass filter means.

9. A noise reduction circuit as claimed in claim 8 in which said first summing means is provided in a signal path extending from the input terminal to the input port of the high pass filter means at a side closer to the input terminal relative to the second subtracting means so as to receive the input video signal from the input terminal at an input port, the second processed signal is supplied to another input port of the first summing means through another feedback loop including a switch which is turned on and turned off respectively during the recording mode and the reproduction mode of the video signal recording and/or reproducing apparatus, and the output preemphasis signal produced by the first summing means is supplied to the second subtracting means and at the same time branched to another output terminal.

10. A noise reduction circuit as claimed in claim 1 further comprising a feedback loop feeding back the high frequency signal component from the high pass filter means to the input port of the high pass filter means, said feed back loop comprising a second amplitude modifying means for producing in accordance with a predetermined amplitude characteristic an output signal responsive to an input signal applied thereto.

11. A noise reduction circuit as claimed in claim 10 in which said second amplitude modifying means is a limiter circuit having an amplitude characteristic changes a gradient thereof forming two slopes of different gradient so as to have a predetermined slope succeeded by a substantially flat slope with an increase in amplitude of an input signal supplied thereto.

12. A noise reduction circuit as claimed in claim 11 in which said second amplitude modifying means is a limiter circuit having an amplitude characteristic which changes a gradient thereof forming more than three slopes of different gradient so as to have a predetermined slope, less steep slope, then substantially flat slope in succession with an increase in amplitude of an input signal supplied thereto.

13. A noise reduction circuit as claimed in claim 1 in which said first subtracting means is connected to the input terminal for receiving the input video signal at an input port thereof for a signal which is subjected to subtraction, said first summing means is connected to an output port of the first subtracting means and to an input port of the high pass filter means so as to receive the output signal from the first subtracting circuit at the input port and so as to supply the output signal to the high pass filter means from an output port of the first summing means, the second processed signal is supplied on the one hand to another input port of the first summing means and on the other hand to another port of the first subtraction means via a switch for a signal to be subtracted, said noise reduction circuit produces the preemphasis signal at an output port of the first summing means when the switch is opened and produces the deemphasis signal at the output port of the first subtracting means when the switch is closed.

14. A noise reduction circuit as claimed in claim 1 in which said first summing means is connected to the input terminal for receiving the input video signal at an input port thereof, said first subtracting means is connected to the first summing means and to the high pass filter means so as to receive the output signal from the first summing means at an input port of the first subtracting means for a signal subjected to subtraction and so as to supply the output signal to the high pass filter means from an output port of the first subtracting means, the second processed signal is supplied on one hand to an input port of the first subtracting means for a signal to be subtracted and on the other hand to another input port of the first summing means via a switch, said noise reduction circuit produces the preemphasis signal at an output port of the first summing means when the switch is closed and produces the deemphasis signal at the output port of the first subtracting means when the switch is opened.

15. A noise reduction circuit as claimed in claim 1 in which the high pass filter means has a time constant Ts determined such that $$T > Ts > T/(X+1)$$

where T stands for a time constant corresponding to a frequency at which the preemphasis/and or deemphasis starts working and X stands for a parameter representing the degree of preemphasis/deemphasis.

* * * * *